United States Patent [19]

Healey

[11] Patent Number: 5,018,077
[45] Date of Patent: May 21, 1991

[54] DATA PROCESSING MACHINES

[75] Inventor: Martin J. Healey, Winchester, England

[73] Assignee: International Business Machines Corporation, Armonk, N.Y.

[21] Appl. No.: 492,242

[22] Filed: Mar. 8, 1990

Related U.S. Application Data

[63] Continuation of Ser. No. 208,306, Jun. 17, 1988, abandoned.

[30] Foreign Application Priority Data

Jul. 8, 1987 [EP] European Pat. Off. ........ 87306029.7

[51] Int. Cl.⁵ .......................................... G06F 15/626
[52] U.S. Cl. ..................................... 364/518; 340/750; 400/63
[58] Field of Search ............... 364/518, 519, 521, 522; 400/83, 63; 340/747, 750

[56] References Cited

U.S. PATENT DOCUMENTS

| | | | |
|---|---|---|---|
| 4,445,795 | 5/1984 | Levine et al. | 400/63 |
| 4,484,826 | 11/1984 | Horn et al. | 400/279 |
| 4,736,309 | 4/1988 | Johnson et al. | 364/521 |
| 4,757,470 | 7/1988 | Bruce et al. | 364/900 |
| 4,789,962 | 12/1988 | Berry et al. | 364/900 |

FOREIGN PATENT DOCUMENTS

| | | | |
|---|---|---|---|
| 1175574 | 10/1984 | Canada | 364/519 |
| 0066047 | 8/1982 | European Pat. Off. | |
| 0075743 | 6/1983 | European Pat. Off. | |

Primary Examiner—Dale M. Shaw
Assistant Examiner—Phu K. Nguyen
Attorney, Agent, or Firm—Robert L. Troike

[57] ABSTRACT

A data processing machine which is controlled to produce graphical output from stored sets of data. The data sets may be stored in the non-uniform manner. The machine is controlled to determine column boundaries in each row of a data set and then to determine column boundaries in each row of a data set and then to determine which rows of the set have missing items. Data sets can then be reformatted as graphs or similar representations. The machine takes away the constraint on users to accurately enter data items into specific slots in a table or data set.

5 Claims, 2 Drawing Sheets

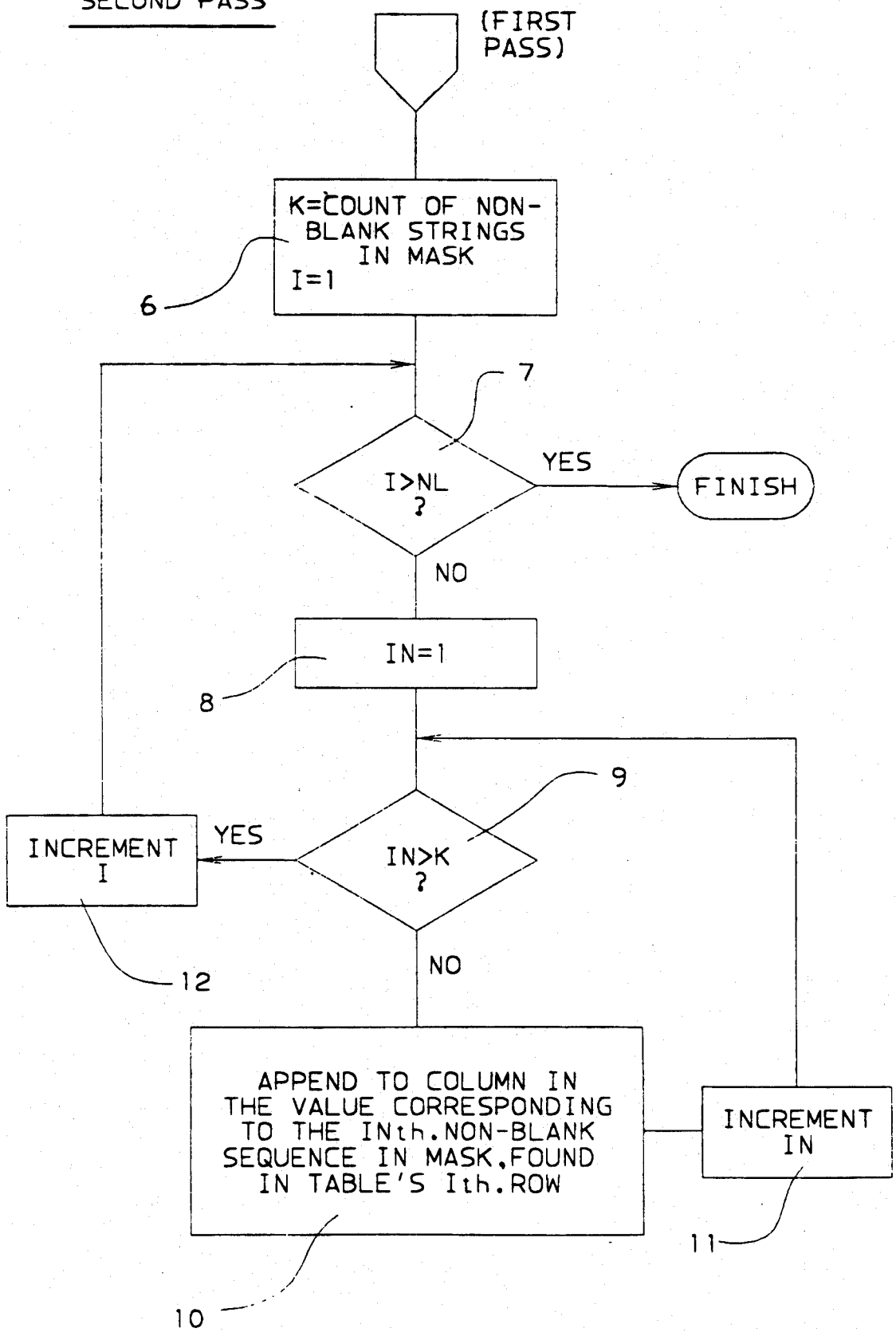

DATA PROCESSING MACHINES

This is a continuation of Ser. No. 208,306, filed 6/17/88, now abandoned.

This invention relates to data processing machines and in particular to such machines that are controlled to produce graphical output from numerical data.

BACKGROUND OF THE INVENTION

One of the major advantages of data processing machines is the ability to change the format in which data is presented in either visual display or printed form. Machines are controlled, using a suitable graphics control program such as the IBM Graphics Data Display Manager (GDDM) (IBM and GDDM are trade marks of the IBM Corporation), to manipulate sets of data and produce almost any form of graph (bar charts, pie charts, line graphs etc.,).

European Patent No. 26266 describes the basic operation of a graphics control program. A digital data display system in which the display device includes a plurality of random access stores into which character cell definitions are loaded from a remote central processing unit. A character cell may be a 9 x 16 picture element matrix and each is defined in the Central Processor Unit (C.P.U.) according to the requirements of a display request received from a users application program. The system control services include a graphics manager and graphics routines which construct a character buffer and character cell definition table according to the picture to be displayed. A character cell definition that is required more than once in a picture is only included once in the definition table. The character buffer having the required number of pointers to the one definition. When the character buffer and character definition table have been constructed they are transmitted to the display device using a data communication system. The system can be used for color or monochrome displays.

A class of application programs process data which generally takes the form of a two-dimensional table. Spreadsheets are a notable example. Business charting programs are another—typically a table may include a number of "sets" of values, with conceptually the same number of items in each set (though some may in fact be missing). For example, the machine may be used to plot sales of a range of products for a number of months:

|  | Jan | Feb | Mar | Apr | May |
|---|---|---|---|---|---|
| Televisions | 45 | 67 | 66 | 98 | 78 |
| Refrigerators | 19 | 24 |  | 67 | 80 |
| Toasters | 50 | 55 | 51 |  | 46 |

Business charting programs normally have a Data Entry facility in which the display screen is formatted into uniform rows and columns of fields, into which the user can type values.

However, manual data entry is tedious and error-prone, and many users already have tabular files stored in their computer which they would prefer the charting program to use. These tabular files may be "soft" copies of printed reports, with regular columns of numbers, or they may be less formal files maintained by the user for his or her own convenience. The latter have the characteristic that the columns may be rather ragged in appearance—the human eye can distinguish the columns and recognize where values are "missing".

The problem with these tabular files for the business charting program lies in understanding the format without too much analysis (which could be time-consuming and therefore frustrating to the user). A solution which the GDDM PFG Interactive Chart Utility uses is to require the user to identify the columns of numbers, by "marking" the top-left and bottom-right positions of each column. This identification can then be saved for future use. The disadvantage is that the "marking" process is awkward to learn and use, and the identification may lose its validity if the user's columns of numbers become more ragged as he adds more numbers from day to day.

SUMMARY OF THE INVENTION

The solution provided by the present invention analyses the table automatically with relatively little processing being required—a scan involving a logical "OR" on each line in the table to establish the column positions, then a scan to extract values. "Missing" values are recognized, even when they occur on the first line in the table. Because the process is economical, the table can reasonably be analyzed every time values are extracted from it, rather than relying on a format identification which may have become out-of-date.

The relevance of the process to spreadsheets is that a spreadsheet can potentially be exported to any different spreadsheet program, with different cell sizes, without the importing spreadsheet program needing specific information about the format of the spreadsheet being imported.

According to the invention there is provided a data processing machine operable to automatically change the format of data to be printed or displayed and in which a set of stored data, nominally arranged in rows and columns, may have items missing and/or be stored in a non-uniform manner, characterized in that when the machine is operable to change the format of a set of data it is controlled to perform the following steps:

a) to determine the column boundaries in each row of the set of data and b) to determine which rows of the set have missing items and to provide an indication in the row of the missing item whereby the control system of the machine is able to identify missing items and column boundaries before a new format of the set of data is produced.

DESCRIPTION OF THE DRAWING

In order that the invention may be fully understood a preferred embodiment will now be described with reference to the accompanying drawings, in which:

FIGS. 2 and 3 are flow charts illustrating the steps of the preferred embodiment.

DESCRIPTION OF PREFERRED EMBODIMENT

Figure 1:
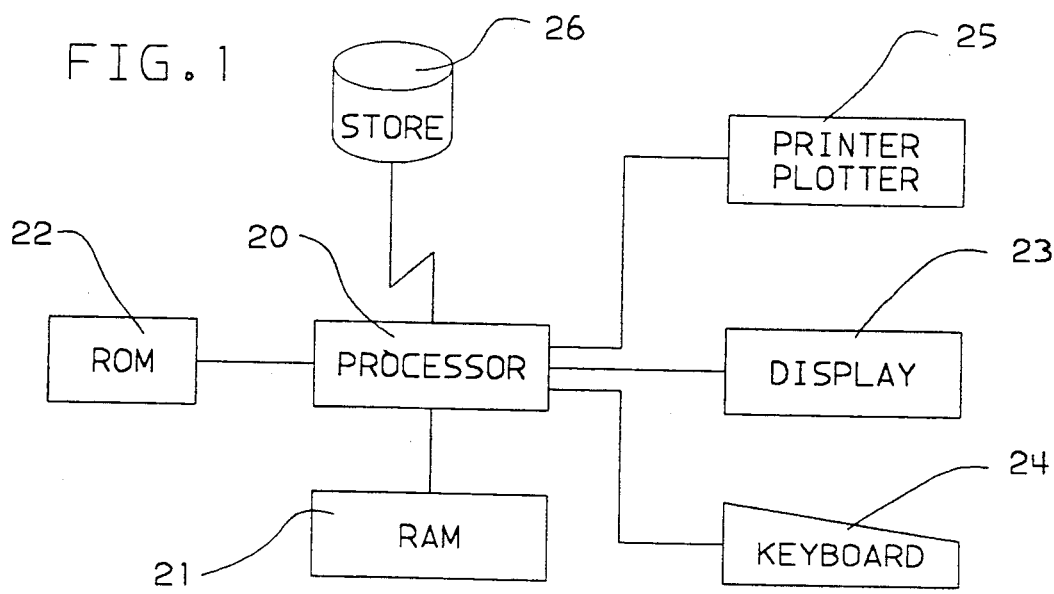
FIG. 1 is a schematic diagram of a machine embodying the invention.

A data processing machine which embodies the present invention is illustrated in FIG. 1. The machine includes a processor 20, a random access store 11, a read only store 22, a display monitor 23, a keyboard 24 and a printer/plotter 25. A disc or tape storage device 26 is connected either directly or remotely to the processor 20. The processor 20 may be a microprocessor such as is found in the IBM Personal Computer (PS/2) or be a host processor connected to the other components through a data link.

Data that have been processed and are not currently being used are stored on the disc store 26, data currently being processed are stored in the random access memory 21. The control of the machine is by program stored in the read only memory 22.

A user may select control function by inputting commands at the keyboard 24 and data re-entered into the machine either directly by a user through the keyboard or from a remote location over a communication link. Data are displayed in the selected format on the display monitor 23 and may be pointed or plotted by the device 25.

The machine is controlled by a series of electrical pulses which enable and disable logic circuit elements in the processor. The sequence of electric pulses is determined by the control program stored in the ROM 22.

A particular embodiment of the invention will now be described with reference to the flow charts of FIGS. 2 and 3. To make for an easier understanding of the invention it will first be described way of example.

The purpose is to find columns of numbers in a rectangular area (table), typically a sequential file or part thereof. It is not known at the outset how many column there may be, and the columns themselves may be ragged left or right edges, or both. The columns may not be complete—they may start or end away from the edges of the rectangular area, and they may contain gaps (missing values). The procedure must be efficient, since large quantities of data may be involved and the user may be waiting for results at the terminal.

The columns in the example below are extremely ragged, but the human eye can tell which numbers belong in which columns.

EXAMPLE

The columns in the example below are extremely ragged, but the human eye can tell which numbers belong in which columns.

| 34   | 47.5  | 13   | 56    |      |
|------|-------|------|-------|------|
| 1003 | 5     | 16.7 | 55.9  |      |
|      | 78    | 0    | 10005 | 34.7 |
| 12   |       |      | 34    | 16   |
| 11   | 45.79 | 1    |       |      |
| 23   | 45    |      | 67.3  | 0    |
| 12   | 14    | 5    | 56    |      |

Many graph-producing packages will extract numbers from a sequential file, as input values for making a graph. They normally require the sequential file to be in fixed format, with columns of numbers in predetermined positions. Alternatively they require the user to define exactly where each column of numbers lies.

The first alternative is too restrictive—people want to be able to input tables of numbers from reports, which are unlikely to be in the required format.

The second alternative tends to be laborious. Moreover, the format definition may lose its validity on future executions of the program, by which time the sequential file may have changed its format (as new numbers are added to it by someone who is unaware of the constraints of the format definition).

According to the preferred embodiment under program control, two passes are made through the table. The first pass detects the columns of numbers, while the second pass extracts them. The first pass detects columns of numbers by noting the presence of "rivers". A river is a column of all-blanks. Adjacent columns of all-blanks are merged to form a single river. The left and right margins of the area are also regarded as all-blank. The strips between the rivers must, by definition, contain the columns of numbers.

The technique is to start with a mask of all-blanks, as long as the width of the table. Each row of the table is successively OR'ed into the mask. At the end of the process the mask will contain sequences of blanks corresponding to rivers in the table, with sequences of non-blanks in the mask corresponding to columns of numbers.

The second pass is applied to each row of the table, and numbers are extracted according to the position in the mask of sequences of non-blanks. An all-blank "number" within a number column is regarded as a "missing value".

This is how the method works in practice. First, the original table as shown in Table 1:

TABLE 1

| 34   | 47.5  | 13   | 56    |      |
|------|-------|------|-------|------|
| 1003 | 5     | 16.7 | 55.9  |      |
|      | 78    | 0    | 10005 | 34.7 |
| 12   |       |      | 34    | 16   |
| 11   | 45.79 | 1    |       |      |
| 23   | 45    |      | 67.3  | 0    |
| 12   | 14    | 5    | 56    |      |

Next, see how the mask develops as lines of the table are OR'ed with it as shown in Table 2:

TABLE 2

```
.................................................... ←— start mask
   34       47.5   13   56
..**.......****...**...**........................... ←— mask
  1003       5    16.7 55.9
..****.....****...****.****......................... ←— mask
            78     0   10005 34.7
..****.....****...****.*****....****................ ←— mask
   12                   34   16
..****.....****...****.*****....****................ ←— mask
   11      45.79   1
..****.....*****..****.*****....****................ ←— mask
   23       45         67.3   0
..****.....*****..****.*****....****................ ←— mask
   12       14    5    56
..*****....*****..****.*****....****................ ←— mask
```

Note:
Dots represent blanks in the mask, and asterisks represent non-blanks.

The table can now be scanned in conjunction with the mask to produce the following interpretation of the columns as shown in Table 3.

TABLE 3

| Col 1 | Col 2 | Col 3 | Col 4 | Col 5 |
|-------|-------|-------|-------|-------|
| 34    | 47.5  | 13    | 56    | 7     |
| 1003  | 5     | 16.7  | 55.9  | 7     |
| ?     | 78    | 0     | 10005 | 34.7  |
| 12    | ?     | ?     | 34    | 16    |
| 11    | 45.79 | 1     | ?     | ?     |
| 23    | 45    | ?     | 67.3  | 0     |
| 12    | 14    | 5     | 56    | ?     |

Note: Missing values are represented here by "?"

Figure 2:
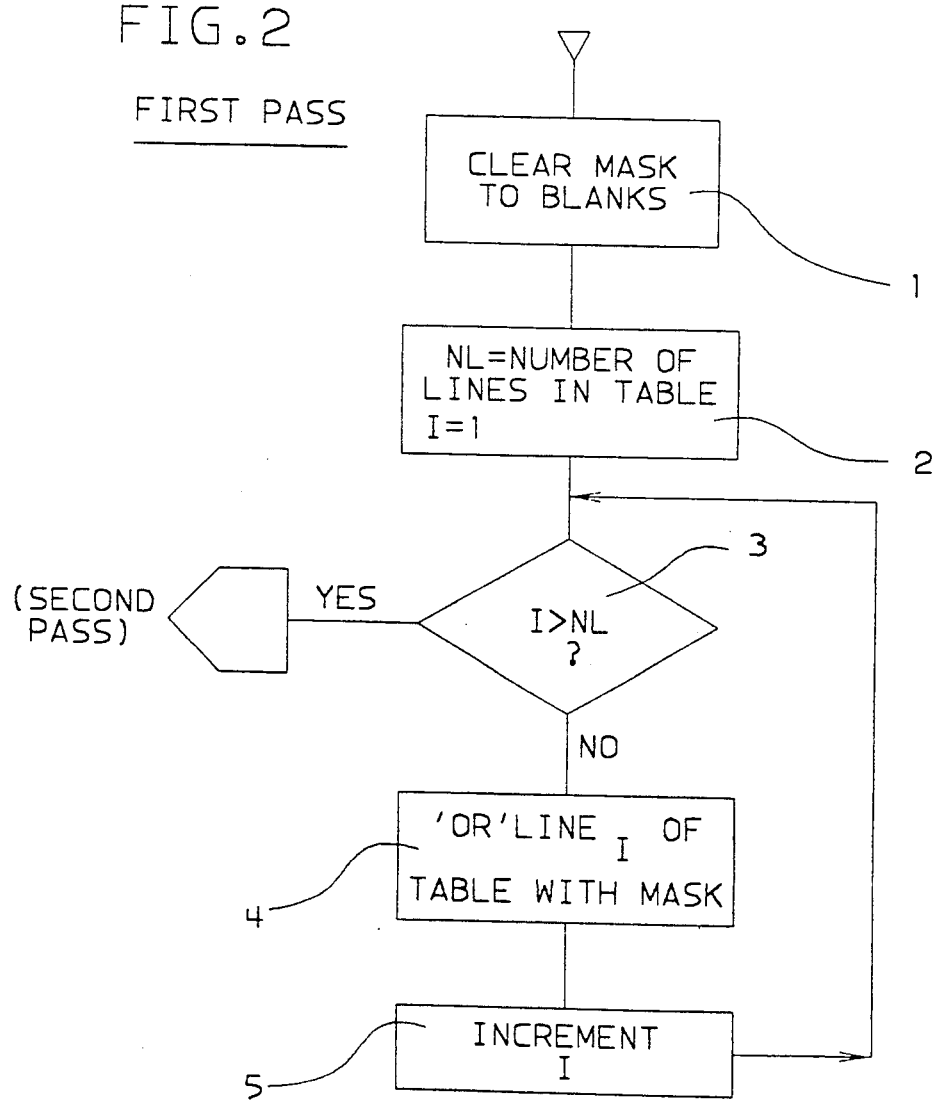

Referring now to FIGS. 2 and 3 the steps of the preferred embodiment of the invention are shown, FIG. 2 is the first pass of the mask and FIG. 3 the second.

| Step 1 (FIG. 2) | The register containing the mask is cleared to all blanks. The register is defined as part of the RAM store 21 and has a number of character positions equal to or greater than the number of character positions in the largest row of the data being processed. |
| Step 2 | Two registers NL and I are defined in the RAM 21 and NL is set with a value equal to the number of rows or lines in the table or data set. I is set with a value equal to 1. |
| Step 3 | The processor 20 compares the contents of I with NL to determine if I > NL. If the determination is positive then the control moves to the second pass starting at Step 6 (FIG. 3). If not then the control proceeds to the next step 4. |
| Step 4 | The processor performs the operation of logically OR'ing the $I^{th}$ row of the table with the mask. To do this the character indication of each character position in turn are read from the mask register and the table row and input to a logical OR circuit and the output of the circuit is fed back to the character position in the mask register. |
| Step 5 | At the conclusion of step 4 the content of register I is incremented by 1 and control is passed back to step 3. |

This loop is repeated until the determination at Step 3 is positive indicating that all the rows or lines have been processed.

The mask register will now contain non-blank for all the column positions in the table with blanks between each column as is shown in the final line of Table 2 in the example above.

| Step 6 (FIG. 3) | A register K is defined in the RAM 21 and the number of non-blank strings in the mask register is counted and the value entered into K. (In the example above K = 5). The value in register I is reset to 1. An area of RAM 21 is defined into which the entries for the columns of the table or data set will be put. The column area will be indexed 1 - K where K is the value in register K. |
| Step 7 | This is a repeat of step 3 except that in this case when I > NL provides a positive output then the process is finished. |
| Step 8 | A register IN is defined in RAM 21 and set to a value 1. |
| Step 9 | Determines whether the value in register IN is greater than the value in register K. If the result is positive then control passes to step 12. If not then on to step 10. |
| Step 10 | Row I of the table is transferred to a register in RAM 21. The characters corresponding to the non blank string IN in the mask are transferred to the column IN data set in RAM 21. If the row has no entries at the $IN^{th}$ position then a value for example $10^{78}$ is entered into the column area. Such an entry indicates to the machine when formatting the data that it represents a missing or neutral value and is to be disregarded when plotting graphs or calculating averages etc. |
| Step 11 | The value in register IN is increased by 1 and control is returned to step 9. |
| Step 12 | The value in register I is increased by 1 and control is returned to step 7. |

When the process is finished data sets equivalent to the number of column will have been built up in RAM 21, as is illustrated above in Table 3. The bounds of the columns are then clearly defined and the data is in a form that can be changed or reformatted by other processes such as the graphics data display manger mentioned above.

The control system of the machine that embodies the invention may be implemented in one of several ways, well known in the art. The control which is in the form of a series of instructions can be permanently stored in the ROM 22, or it may be stored as a routine in the store 26 and loaded into the RAM 21 only when required for use. Other methods include a specifically design semiconductor chip which has the control system built into its topography when the chip is designed and manufactured.

I claim:

1. A data processing machine operable to automatically change the format of data to be printed or displayed and in which a set of stored data, nominally arranged in rows and columns, have items missing or stored in a non-uniform manner comprising:
    a) first means without predetermining the width of the columns for automatically recognizing and determining the column boundaries in each row of the set of data by determining the sequences of all blank areas and strips between all blank areas that contain sequences of non-blanks, and
    (b) second means for determining which rows of the set of data have missing items and for providing an indication in the row of the missing item whereby a control system of the machine is able to identify missing items and column boundaries before a new format of the set of data is produced.

2. A data processing machine as claimed in claim 1 in which said first means includes:
    means for constructing and storing a mask of blank characters for the longest row in the set of data and means for taking each row of the set of data in turn and performing a logical OR operation on it with said mask and restoring the cumulative result of the OR operation so that after processing a final row said mask contains a non-blank character in every position for which there is a corresponding character in at least one row of the set of data.

3. A data processing machine as claimed in claim 2 wherein said second means includes:
    means for determining the number of non-blank strings in the cumulative mask and constructing a data subset for each non blank 4. A data processing machine as claimed in claim 3 including:
    means for entering into the data subsets an indication of missing values from the set of data.

5. A method of automatically changing the format of data to be printed or displayed and in which a set of stored data, nominally arranged in rows and columns, have items missing or stored in a non-uniform manner comprising the following steps:
a) automatically constructing and storing a mask of blank characters for the longest row in the set of data without predefining the column widths,
b) automatically performing a logical OR operation for each row of the set in turn with the mask and restoring the cumulative result of the OR operation so that after processing the final row the mask contains a non-blank character in every position for which there is a corresponding character in at least one row of the set.
c) determining the number of non-blank strings in the cumulative mask and constructing a data subset for each non-blank string comprising the corresponding items from the rows of the set of data, and
d) entering into the data subsets an indication of missing values from the set of data.

* * * * *